May 11, 1943.  J. E. CROWELL  2,319,115

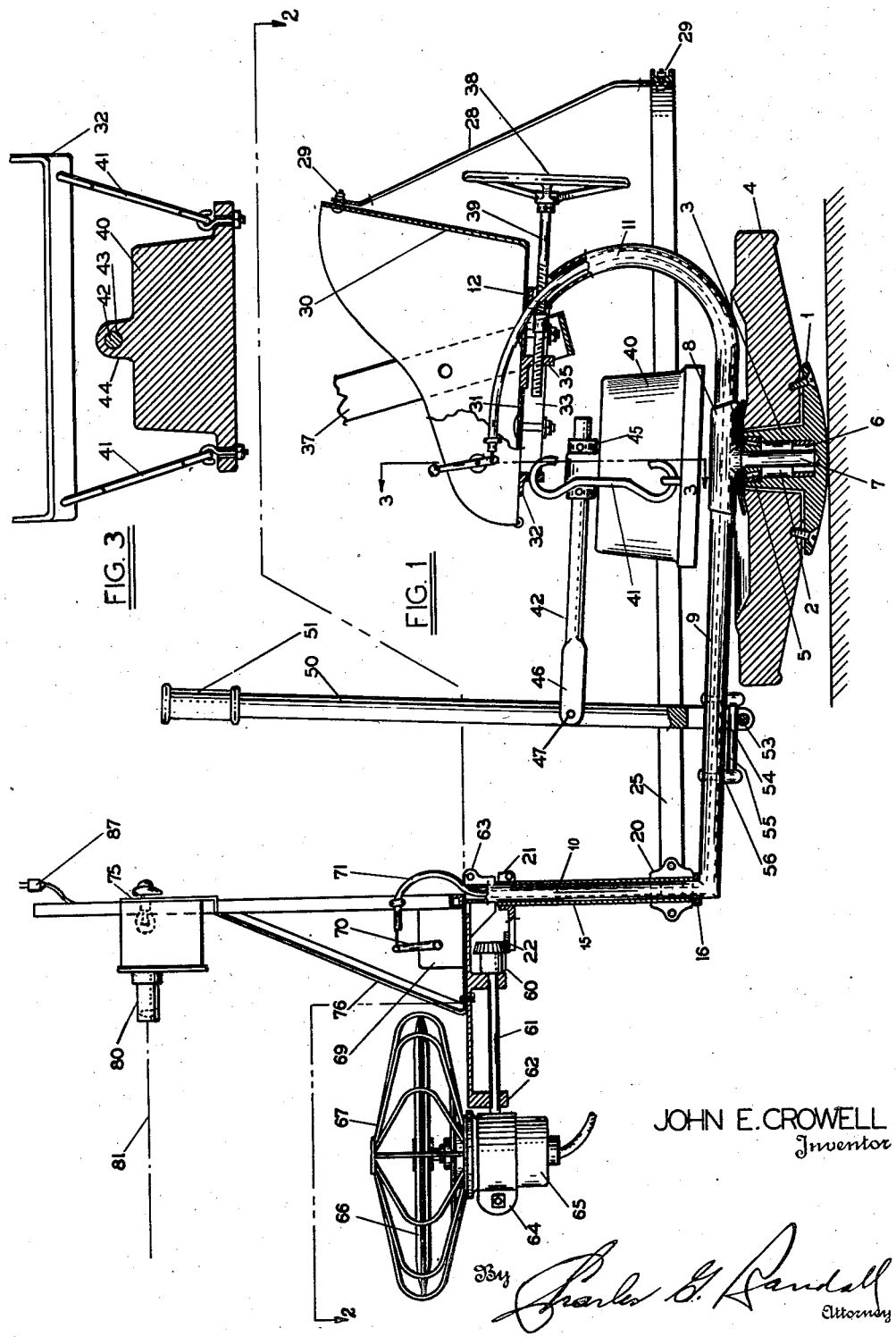

TRAINING DEVICE FOR AVIATORS

Filed Feb. 26, 1941  2 Sheets-Sheet 2

Inventor
JOHN E. CROWELL
By Charles G. Randall
Attorney

Patented May 11, 1943

2,319,115

UNITED STATES PATENT OFFICE 2,319,115

TRAINING DEVICE FOR AVIATORS

John E. Crowell, Charlotte, N. C.

Application February 26, 1941, Serial No. 380,702

11 Claims. (Cl. 35—12)

This invention relates to an aviation trainer of the grounded type for the primary training of aviation students, and more particularly to such an apparatus of comparatively simple construction in which the student may be readily taught to operate and under proper instruction may learn the fundamental principles of actual flying.

An object of the invention is to provide an apparatus of the above nature possessing few mechanical parts which may be easily and economically fabricated, and which when properly operated will simulate the varying conditions encountered in flying an airplane.

Another object of the invention is to combine in a simple machine, control elements of an airplane so that the student flyer in operating the machine will gain confidence and that necessary coordination of senses and the proper physical reaction thereto which is so essential to the proper and safe handling of an airplane.

A further object is to create in the mind of the student flyer the sense or "feel" of an actual airplane by insuring that the training apparatus will impart the mechanical, physical, and mental sensations of flight so that a student who learns to successfully operate the trainer, will have little difficulty in quickly absorbing the basic training required for actual airplane flight.

Another object of the invention is to mount a projector on the training machine so that the student pilot operating the machine may carry through an entire course of instruction including simulation of take-off, normal and abnormal flight, and landing, without any physical danger to the pupil.

Still another object of the invention is concerned with a means and apparatus for instructing a student pilot in following a chart or target made up in such a manner that the machine will simulate certain conditions of flight that may be met in the subsequent actual operation of an aircraft by the student, and which will permit the student to become acclimated to the "feel," physical positioning, propeller noise, and sense of balance or unbalance, constantly present in piloting an actual aircraft.

The present trainer, because of the complete range of simulated flying sensations, is designed to teach the student to:

1. Completely relax and allow the body to acquire the "feel" of the plane.
2. Acquire confidence and coordinate his sensations and the proper physical reactions thereto incident to all maneuvers such as, keeping the plane on a level straight flight and correcting any tendency to "yaw" by a slight right or left pressure on the rudder bar.
3. Give a gentle pressure forward or backward on the control stick when the nose of the trainer moves up or down.

Other proper habits are inculcated by permitting the student to move the control stick slightly to the left if a simulated flying condition is introduced such as the dropping of the right wing, or vice versa. Another simulated flying condition may be introduced into the apparatus by movement of the rudder bar either to the right or left producing a simulation of actual flight conditions wherein for example, the right or left aileron may drop slightly thereby in effect increasing the lift upon the corresponding wing causing it to rise. Consequently the student must exert some pressure on the control stick in the opposite direction in order to again balance the trainer. Still another simulated flying condition may be introduced into the machine by manipulation of the rudder bar to reproduce or simulate a situation wherein a wing of a ship in flight may drop. As the wing drops, the nose of the ship will turn in the direction of the lowered wing and the proper correction for this situation is taught the pupil by causing him to coordinately use opposite rudder and opposite pressure on the control stick.

Under the present regulations the basic 8-hour training required to be successfully negotiated before solo flights are permitted generally comprise the following maneuvers: 1. Straight and level flight; 2. Normal climb; 3. Normal glide; 4. Gentle turns in level flight; 5. Gentle S turns in level flight; 6. Gentle turns of 180 degrees; 7. Gentle turns of 360 degrees; 8. Gentle turns in normal glide; 9. Turns of 45 degrees bank; 10. Turns of 90 degrees bank; 11. Glide approaching field; 12. Landings; 13. Take-off from field; 14. Spins; 15. Forced landings.

With the present apparatus, all of these conditions may be simulated and the present basic training requirements may be materially reduced without hazard to the pupil and without the use of an expensive training plane and a qualified teacher for each student, because one instructor may train a number of pupils using trainers embodying the principles of the present invention.

Fig. 1 is a side elevation of the trainer.

Fig. 3 is a detail of construction, being a vertical section taken on line 3—3 of Fig. 1.

Figure 4:
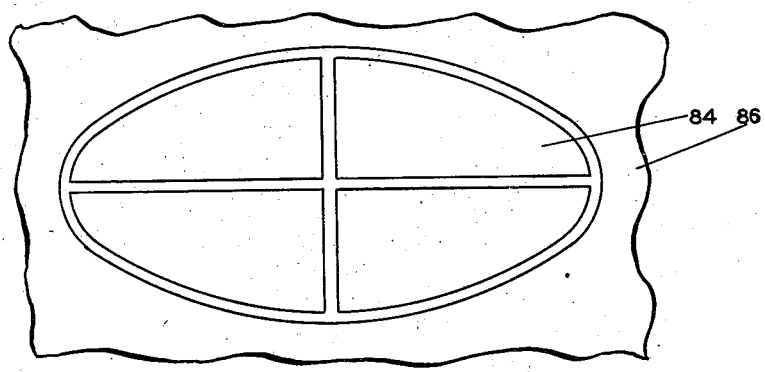
Fig. 4 is an elevational view of a flight chart or diagram which may be employed with the training apparatus.

Specifically, the trainer disclosed in the accompanying drawings includes a spherical segment 1 forming a surface engaging universally movable base for the entire mechanism. The sphere-segment 1 has a vertical bore 2 formed in the upwardly extending hub 3 thereof with a comparatively large, heavy circular weight 4 removably secured to the segment 1 to act as a balance for the trainer while permitting limited rocking or universal movement on the spherical surface of the surface engaging segment 1.

An upper combined radial and thrust bearing 5, and a lower bearing 6 are positioned in the bore 2 to support a vertical spindle 7 whose upper end is threaded into a T pipe fitting 8. The main frame, and entire super-structure of the trainer is supported by engagement, fore and aft, with this fitting 8 and thence to vertical pivot 7.

The front part 9 of the main frame extends forwardly and then upwardly at 10, while the rear part 11 of the frame extends upwardly on a curved radius, terminating at its upper end with a transverse angle bar 12.

The chassis frame, 8, 9, 10, and 11 is shown fabricated from piping, although it will be understood that any suitable form of material, such as angle bars, solid rods, etc., may be substituted without departing from the present invention.

As disclosed in the several figures of the drawings, a tubular sleeve 15 is telescoped over the vertical portion 10 of front part of the frame with the lower end of the sleeve resting on a bearing flange 16 rigidly secured to the frame 10 adjacent its juncture with part 9.

Figure 2:
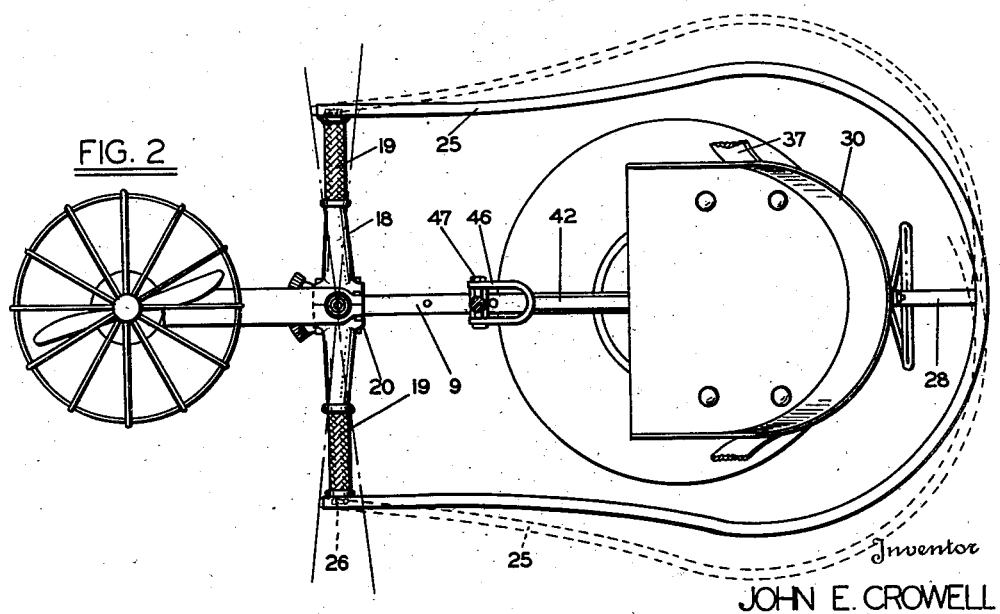
Fig. 2 is a top plan view with some parts in section taken on line 2—2 of Fig. 1.

A laterally extending vertically pivoted rudder bar 18, made up of opposite foot supporting portions 19 is clamped at 20 to the rotatable sleeve so that the sleeve is oscillated on the frame portion 10 when the operator moves the rudder bar, as indicated in dotted line positions shown in Figure 2. Any such movement also partially rotates a forwardly extending quadrant bracket 21 fastened at the upper end of the sleeve 15. Gear teeth 22 are formed on the outer top side of the quadrant for purposes to be hereinafter described.

A continuous horizontal band or loop 25 formed similar to a horse shoe, encircles the trainer from the rudder bar rearward with the ends of the loop 25 loosely and pivotally bolted at 26 to the outer ends of the rudder bar 18. The bar 25 is also supported at approximately its mid-central rearward point by a vertically extending strap or brace 28, having its lower end pivotally attached by bolt 29 to the band 25 and its upper end pivotally attached to the rear of the adjustable operator's or student's seat 30. It will be obvious that when the rudder bar is moved for a turn, the loop 25 will be shifted to a side position off center and cause that side to lower.

The operator's seat 30 may be of any suitable construction, as for instance, it may be similar to the conventional bucket seat of the type used in many airplanes, the salient feature being its longitudinal adjustability to insure an initial balancing of the operator's weight with relation to the center of gravity of the machine. To this end, the bottom 31 of the seat is slidably attached, to the box frame formed by the front angle bar 32 and side bars 33 welded or otherwise secured to the bar 12. This construction makes a firm support for the seat bottom which in turn is provided with a depending angle bar 35 and depending bolts 36 for loose engagement with the side frame bars 33.

A hand wheel 38 carrying a rotatable screw threaded rod 39 passes in threaded engagement through right and left hand threaded openings formed in the angle bars 12 and 35 respectively, whereby the seat may be quickly moved back and forth over the box frame when the hand wheel is rotated.

The seat has a conventional safety belt 37 which is worn by the operator to hold him in the seat during operations of the trainer. A comparatively heavy weight 40 is suspended by a pair of spaced apart rods 41 from the front seat supporting angle bars 32 in such a manner that the weight may be swung backward and forward and have limited side sway movement. Movement is given the weight 40 through the medium of a rod 42 passing through an opening 43 formed in the lug 44 on the upper central part of the weight, the rod being adjustably secured by lock collars 45.

The forward end of the rod 42 is bifurcated and forms a yoke 46 which is pivotally secured by a pin 47 to the vertically extending control stick 50 which in turn is provided with a hand grip 51, similar in general formation to the corresponding control device or "joy stick" on an airplane.

The lower end of this control lever terminates in a universal connection comprising a transverse pivot pin 53 set in a bracket 54 that is pivoted on the horizontal rod 55 suspended on depending bolts 56 below and parallel to the frame member 9. Thus the weight 40 may be swung in several directions by corresponding movement of the control stick 50, it being understood that any movement imparted to the universally mounted control stick 50 will swing the heavy weight 40 to a new position corresponding to the movement of the control stick, thereby causing the trainer to tilt in a manner closely simulating that of an airplane in flight.

It should be here pointed out that aside from any movement of the weight 40 or the loop 25, the machine is very delicately poised on the small area of the sphere-segment 1 which is in contact with the supporting surface, and that if the machine is properly adjusted, the slightest movement of the student in the seat will throw the entire apparatus off balance requiring the student to immediately correct to maintain his position on an even keel. Thus the shifting of the operator's weight becomes an important factor in the complete operation of the device. In actual flying, updrafts, wind pockets, and other disturbing air conditions are elements which tend to cause an aircraft to deviate from level flight and accordingly, result in the necessity for proper control by the pilot. In the training apparatus of the present invention the fact that the operator's position is so difficult to maintain unless proper control is exerted, results in a simulation of the disturbing air conditions present in actual flight.

It should also be pointed out that the distortion of the loop 25 produces in the trainer the simulation of a yaw and starts a turning movement of the apparatus upon its spherical base. This operation takes place without the introduction of any propeller action as hereinafter described.

As was previously described, the rudder bar 18 is clamped around the sleeve 15 mounted on vertical fixed frame 10 and consequently when the rudder bar is moved the gear segment 21 secured at the top of the tube 15 is rotated or oscillated. Meshing with the teeth 22 on the segment is a pinion 60 mounted on shaft 61 and carried by depending arms 62 of the forwardly extending bracket 63 that is rigidly affixed to the upper end of the frame portion 10. A clamp 64 on the outer end of shaft 61 holds an electric motor 65 which drives a propeller 66 encased in a guard 67. Thus the rudder bar 18 controls the position and movement of shaft 61 and the plane of the propeller 66.

The propeller 66 when in operation and in a horizontal position exerts a pressure which tends to raise the nose of the apparatus requiring the proper forward movement of the control stick 50 to maintain the apparatus on an even keel. As the motor and propeller unit 65—66 is rotated by the use of the rudder bar, the apparatus begins to make a turn upon its pivotal base and the lifting pressure being at the same time reduced, the nose of the apparatus will have a tendency to drop, requiring the student to correct this position by proper control of the stick to again raise the nose for level flight.

Figure 5:
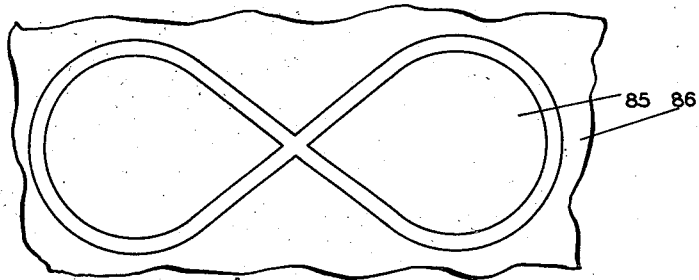
Fig. 5 is a view similar to that of Fig. 4 but showing a different type of chart.

The speed of the motor 65 is adjusted by means of a rheostat 69 positioned on top of the bracket 63, the arm 70 of the rheostat being moved by a Bowden wire 71 concealed in the frame to a point on the side of the operator's seat 30 where a pivoted arm 72, simulating a throttle is connected to the Bowden wire. Movement of the "throttle" 72 operates the rheostat, to increase or decrease the speed of the motor 65 and its propeller 67. Also supporting the vertical frame 10 and bracket 63 is an upstanding standard 75 having an oblique brace 76. This standard may represent the instrument board of an airplane and have mounted thereon flying instruments and the like. The standard 75 may also carry a projector 80 which is designed to project a spot of light indicated by the lines 81 against a target or flight chart 84 or 85 placed on a wall or background 86 a short distance in front of the trainer apparatus. Two specific targets are shown in Figures 4 and 5 but it will be understood that any number or type of charts of a similar nature may be employed comprising suitable designs which when followed by the beam of light as controlled by the student in the trainer, will present and illustrate all problems and conditions of flight encountered from take-off to landing. This method gives the student an opportunity to practice the exact control of the trainer under varying flight conditions without instruction.

The standard 75 may also act as a point of connection for electrical wiring and switch mechanism 87 leading to the projector 80 and propeller motor 65.

In operation the student seats himself in the seat 30 and adjusts the strap 37 with his feet on the roughened sections 19 of the rudder bar 18. The instructor or student then turns the hand wheel 38 to adjust the position of the seat to set the machine with the student on even keel and thereafter the propeller 66 or other prime mover is started up by operation of the hand lever 72 which simulates the engine throttle.

As previously pointed out, the apparatus may be thrown off balance by any slight movement of the operator, thus requiring the proper correction by the student. In addition to the necessity for the student to maintain the proper correction for any off balanced condition arising from the movement of his body, he is required to manipulate the control stick 50 and the rudder bar 18 thus placing the apparatus in proper position for any given maneuver. By manipulating the control stick 50 to the right, left, backward or forward, the machine may be moved from an even keel position to simulate a bank, turn, climb, or dive in actual flight. The rudder bar 18 may be manipulated to tilt the vertical axis of the propeller 66, which being of the tractor type, will further accentuate any tilting or turning movement imparted to the trainer as a whole. Any movement imparted to the rudder bar 18 also distorts the encircling loop 25 as shown by the dotted lines in Figure 2 and due to the pivotal connection of the rear end of the loop to the seat, it will impart a portion of the movement as a whole, or the distortion of the loop alone may be employed to produce certain effects separately from the other portions of the apparatus.

Various modifications of the invention as herein described will present themselves to those skilled in the art, but it will be readily understood that many modifications may be made in construction and design without departing from the spirit and scope of the invention as set forth in the appended claims.

I claim:

1. An aviation training device including a frame, a seat mounted on one end of the frame and a prime mover on the opposite end thereof, a supporting surface engaging universal mount for the frame, a horizontal laterally extending rudder bar pivoted adjacent the front end of the frame, and means connecting the rudder bar to the prime mover to vary the position of the prime mover.

2. An aviator trainer comprising a sphere-segmental support, a frame on said support including a seat, means on said frame for causing the frame to turn relative to the sphere-segmental support, means on said frame for unbalancing the frame and seat by tilting said support to simulate banking, ascent and descent of an aircraft, and means on said frame under the control of an operator in said seat for controlling the turning means and for rebalancing the frame after the unbalancing thereof.

3. A trainer comprising a universally tiltable support, a frame rotatably mounted upon said support and including an operator's seat, means connected to said frame to cause said frame to rotate relative to said support, means on said frame for unbalancing the frame and operator's seat by tilting said support, and means on said frame under the control of an operator in said seat for controlling the turning means and for balancing the frame.

4. A trainer comprising a sphere-segmental support, a frame on said support including a seat, means on said frame for causing the frame to turn, means on said frame for unbalancing the frame and seat by tilting the support, means on said frame under the control of an operator in said seat for controlling the turning means and for balancing the frame, said turning means comprising a propeller on said frame, and a rudder bar on said frame and connected to said propeller for varying the plane thrust thereof to effect a rate of turn in accordance with the rudder bar position.

5. A trainer comprising a sphere-segmental supporting surface, a frame on said support including a seat, means on said frame for causing the frame to turn, means on said frame for unbalancing the frame and seat by tilting the support, and means on said frame under the control of an operator in said seat for controlling the turning means and for balancing the frame, said means for balancing the frame comprising a weight pivotally mounted on said frame and a control lever for moving said weight.

6. A trainer comprising a frame including an operator's seat mounted upon a sphere-segmental support, said support being capable of rotation and universal rocking movement responsive to the shifting of the operator's weight, and means for offsetting such rocking movement comprising a pivoted weight on said frame and a control lever connected thereto and under the control of the operator in said seat.

7. A trainer comprising a frame including an operator's seat mounted upon a sphere-segmental support, said support being capable of rotation and universal rocking movement responsive to the shifting of the operator's weight, means for offsetting such rocking movement comprising a pivoted weight on said frame and a control lever connected thereto and under the control of the operator in said seat, and means for adjusting the position of said weight with respect to the seat for preliminary equilibrium.

8. A trainer comprising a frame including a seat mounted upon a support, said support being capable of universal rocking movement responsive to the shifting weight of an operator in said seat, said support and frame also being capable of turning movement, means for offsetting such rocking movement comprising a pivoted weight on said frame and a control lever connected thereto and under the control of the operator in the seat, another movable weight carried by said frame, and a rudder bar having connections with said second weight for upsetting the equilibrium thereof and causing said support and frame to yaw.

9. An aviation trainer comprising a universally tiltable support, a frame including a seat mounted thereon, said entire device being tiltably responsive to simulate flight conditions by both the shifting of an operator's position in said seat and the shifting of a weight pivoted to said frame beneath said seat and under the control of the operator, whereby the operator can offset the tilting caused by his own unstable position.

10. A trainer comprising a universally tiltable support, a frame including a seat mounted thereon, said entire device being tiltably responsive both to the shifting of an operator's position in said seat and to the shifting of a weight pivoted to said frame and under the control of the operator, whereby the operator can offset the tilting caused by his own unstable position, means on said frame for turning the same, means on said frame for projecting a beam of light, a track marking of selected configuration on a fixed chart positioned at a spaced point away from said trainer and in cooperating relation to said trainer whereby the operator of said trainer can practice maneuvers with said trainer by so moving the same that the projected beam of light follows said track marking.

11. An apparatus capable of performing simulated flying maneuvers comprising a grounded trainer adapted to simulate the tilting and turning of an aircraft, said trainer including a universally tiltable frame having a light projector thereon in such manner that a fixed beam of light from said projector may be made to follow marked paths of a selected configuration on a fixed chart positioned at a point away from the trainer and corresponding to the banks and turns of said maneuvers.

JOHN E. CROWELL.